United States Patent Office 3,741,949
Patented June 26, 1973

3,741,949
EXTRACTION OF BACITRACIN WITH NON-IONIC RESINS
Bernard Ores, Montreuil-sous-Bois, and Claude Rauber, Saint-Denis, France, assignors to Roussel-UCLAF
No Drawing. Filed Oct. 7, 1970, Ser. No. 78,963
Claims priority, application France, Oct. 10, 1969, 6934774
Int. Cl. C07c 103/52
U.S. Cl. 260—112.5     4 Claims

ABSTRACT OF THE DISCLOSURE

A novel process for the extraction of bacitracin from fermentation broths wherein the said antibiotic was formed by micro-organisms, by adsorption on nonionic resins.

STATE OF THE ART

Various processes for the extraction of bacitracin from fermentation broths have been described and generally these processes employ a first stage for the removal of solid elements from the whole fermentation broth to obtain a clear solution from which the bacitracin is extracted. This initial clarification is often expensive on the industrial scale and, therefore, a commercial process without this clarification step has been desired.

OBJECTS OF THE INVENTION

It is an object of the invention to provide a novel process for the recovery of bacitracin from fermentation broths without an initial clarification.

It is another object of the invention to provide a process for the recovery of bacitracin from fermentation broths by adsorption on a nonionic adsorbant resin.

These and other objects and advantages of the invention will become obvious from the following detailed description.

THE INVENTION

The novel process of the invention for the extraction of bacitracin from a fermentation broth in which the antibiotic was produced by micro-organisms by effecting fermentation in an appropriate nutritive media of a bacitracin producing micro-organism comprises after the fermentation is completed adding to the fermentation broth a nonionic adsorbant resin having a very large specific surface, leaving the resin in contact with the entire broth for at least one hour, separating the resin from the fermentation broth, eluting the resin with a low molecular weight alkanol, removing at least part of the alkanol from the eluate and extracting bacitracin from the resulting solution by known means.

The term nonionic resin is intended to mean resins of a polymer having a three dimensional skeleton and containing no functional groups. Resins with a large specific surface are resins having a specific surface of at least 50 m.$^2$ per gram of resin.

The low molecular weight alkanols used for eluting the resin are alkanols of 1 to 6 carbon atoms such as methanol, ethanol, isopropanol, etc.

The starting fermentation broth containing the bacitracin can be obtained by the known production procedures for the antibiotic described in the literature. One example of producing bacitracin is described in U.S. Pat. No. 2,789,941.

In putting the extraction process of the invention into use, the resin used preferably has a macrolattice and is porous with pores having a diameter of 50 A. to 250 A. and whose adsorbant surface is of the order of 250 to 1000 m.$^2$ per gram. One such resin can be a resin of a polystyrene polymer such as the commercial resin sold under the mark Amberlite XAD-2 whose pores have a diameter of 85 to 95 A. and whose adsorbant surface is 290 to 330 m.$^2$ per gram or an acrylic resin such as the commercial resin sold under the mark Amberlite XAD-7 whose pores have a diameter of about 87 A. and whose specific surface is about 445 m.$^2$ per gram.

In general practice, 100 to 350 cc. of the resin per liter of fermentation broth to be treated are added in one or several times. It has been verified for example that 125 cc. of resin per liter of fermentation broth is sufficient for the extraction of the antibiotic under very satisfactory conditions. Generally, the resin is left in contact with the fermentation broth for 1 to 15 hours and advantageously about 5 hours. The resin can then be isolated from the whole fermentation broth by the use of a simple screening.

The resin is most advantageously eluted with methanol with the volume of the former being 2 to 5 times that of the resin used. The eluate is then recovered and the methanol is eliminated by concentration in vacuo to obtain an aqueous solution of bacitracin from which the antibiotic can be isolated by known means.

It has been shown that a thus obtained solution of bacitracin contains an average 70% of the bacitracin activity contained in the starting fermentation broth. The yields of the extraction process of the invention are very interesting in as much as one knows that numerous processes that have actually been used industrially do not present yields of more than 45%.

Starting from the concentrated bacitracin solution obtained by the process of the invention, the antibiotic can be recovered for example by precipitation in the form of zinc bacitracin, by direct atomization to obtain the bacitracin in raw form or also by purification of the bacitracin solutions by known means to obtain finally bacitracin of pharmaceutical quality. Numerous processes for recovering bacitracin from concentrated aqueous solution of bacitracin, are described, such as, for example, in British Pat. No. 892,083 and U.S. Pat. 2,834,711.

In the following examples there are described several preferred embodiments to illustrate the invention. However, it is to be understood that the invention is not intended to be limited to the specific embodiments.

EXAMPLE I

A strain of *Bacillus subtilis* capable of producing bacitracin was added to an aqueous fermentation medium consisting essentially of soya flour, corn starch and sodium sulfate and the mixture was maintained with agitation for fermentation for 23 hours in aerobisis and at 38° C. to obtain 4.5 liters of a ferment titrating 510 units of bacitracin per cc. 1.5 liters of a nonionic resin of polymeric polystyrene (Amberlite XAD-2) were added to the ferment and the mixture was stirred for 6 hours. After removing the resin by screening, the solid resin was placed into a column and eluted with 3.9 liters of methanol to obtain an eluate titrating 466 units of bacitracin per cc. 0.55 liter of water were added to the resulting eluate and methanol was distilled from the resulting mixture by evaporation in vacuo at 20° C. to obtain 1.15 liters of an aqueous solution of bacitracin titrating 1,740 units per cc. after returning the temperature to 15° C. The percent yield of the extraction calculated by dividing the bacitracin activity in the resulting aqueous solution by the bacitracin activity in the entire fermentation broth was 86%.

Sufficient sulfuric acid was added to the aqueous solution of bacitracin to adjust the pH to 3.5 and after stirring the mixture for 10 minutes, 325 cc. of a zinc chloride solution having a density of 1.25 were added thereto. The mixture was stirred for 30 minutes and the pH was then adjusted to a pH of 7.0 by the addition of 54.5 cc. of 10 N sodium hydroxide solution while still stirring. The mixture was allowed to stand for 2 hours at 15° C. and was then filtered to recover the formed precipitate which was then dried to obtain 38.2 gm. of zinc bacitracin having a bacitracin activity of 46.5 units per mg. (extraction yield of 77.5%).

EXAMPLE IX 8.4 liters of a ferment prepared as in Example I and having a bacitracin activity of 495 units per cc., had added thereto twice 1.2 liters of a nonionic polymeric polystyrene resin (Amberlite XAD-2) and the mixture was stirred for 5 hours after each addition. The resin was then separated by screening and was placed into a column and eluted with 4.2 liters of methanol. The methanol solution was concentrated under vacuum and water was added thereto to obtain a solution titrating 1950 units of bacitracin per cc. (extraction yield of 75%).

The resulting solution was treated as in Example I for extraction of bacitracin to recover 104 gm. of zinc bacitracin titrating 28 units per mg. This is equal to 70.5% of the bacitracin activity in the starting ferment.

EXAMPLE III 110 cc. of acrylic resin (Amberlite XAD-7) were added twice to one liter of a ferment obtained as in Example I and having a bacitracin activity of 490 units per cc. and the mixture was stirred for 6 hours after each addition. The resin was recovered by screening and was added to column and eluted with 330 cc. of methanol. The eluate titrated 965 units of bacitracin per cc. and represented 86.4% of the beginning antibiotic activity.

The eluate was concentrated under vacuum to remove the methanol and the eluate was then added to 100 cc. of water. The bacitracin was precipitated in the form of zinc bacitracin using the procedure of Example I to obtain 9.21 gm. of product titrating 33 units of bacitracin per mg. which was a total extraction yield of 64%.

Various modifications of the process of the invention may be made without departing from the spirit or scope thereof, and it should be understood that the claims are intended to be limited only as defined in the appended claims.

We claim:
1. A process for the extraction of bacitracin from a fermentation broth in which bacitracin was produced by fermentation of bacitracin producing micro-organisms in a nutritive media comprising after the fermentation is completed adding to the fermentation broth a nonionic adsorbant resin selected from the group consisting of a polystyrene resin and an acrylic resin and having a pore diameter of 50 to 250 A. and an adsorbent surface of 250 to 100 m.$^2$ per gm., leaving the resin in contact with the entire broth for 1 to 15 hours at room temperature, separating the resulting resin from the fermentation broth, eluting the resin with a low molecular weight alkanol of 1 to 6 carbon atoms, removing at least part of the alkanol from the eluate and recovering bacitracin from the resulting solution.

2. The process of claim 1 wherein the nonionic resin is a polystyrene resin having a pore diameter of 85 to 95 A. and an absorbant surface of 290 to 330 m.$^2$ per gram.

3. The process of claim 1 wherein the resin is an acrylic resin having a pore diameter of about 87 A. and an absorbant surface of about 445 m.$^2$ per gram.

4. The method of claim 1 wherein the alkanol is methanol and the volume thereof used is 2 to 5 times the volume of the resin.

References Cited

UNITED STATES PATENTS

| 2,457,887 | 1/1949 | Goorley | 260—112.5 |
| 2,609,324 | 9/1952 | Senkus et al. | 260—112.5 |

OTHER REFERENCES

Gustafson et al.: Ind. Eng. Shem., Prod. Res. Develop. 2, 107–115 (1968).

Schneider et al.: J. Phys. Chem. 69, 1310–1324 (1965).

Steinberg et al.: J. Amer. Chem. Soc. 84, 2890–2892 (1962).

ELBERT L. ROBERTS, Primary Examiner

U.S. Cl. X.R.

424—177

UNITED STATES PATENT OFFICE
CERTIFICATE OF CORRECTION

Patent No. 3,741,949          Dated June 26, 1973

Inventor(s) Bernard Ores et al.

It is certified that error appears in the above-identified patent and that said Letters Patent are hereby corrected as shown below:

In the heading, column 1, line 10 "4 Claims" should read -- 3 Claims --.

Claim 1, lines 7 and 8 cancel "resin selected from the group consisting of a polystyrene resin and an"

Claim 1, line 8, cancel second occurrence of "and".

Signed and sealed this 25th day of June 1974.

(SEAL)
Attest:

EDWARD M. FLETCHER, JR.
Attesting Officer

C. MARSHALL DANN
Commissioner of Patents